United States Patent Office 2,911,434
Patented Nov. 3, 1959

2,911,434
SURFACE ACTIVE DICARBOXYLIC ACID ESTERS OF POLYALKYLENE OXIDES

Earl T. Kocher, Lakewood, Calif., assignor to Visco Products Company, Houston, Tex., a corporation of Delaware No Drawing. Application April 24, 1956
Serial No. 580,189
9 Claims. (Cl. 260—475)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil types of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

An object of the invention is to provide a novel reagent which is water-wettable, interfacial and surface-active in order to enable its use as a demulsifier or for such uses where surface active characteristics are necessary or desirable. Other objects will appear hereinafter.

The products provided in accordance with this invention can be described as organic polycarboxy acid esters of aliphatic ether alcohols having three terminal primary hydroxy groups, said esters being characterized by a central aliphatic group, preferably containing not more than 6 carbon atoms, and three polyoxyalkylene chains attached to different carbon atoms of said central group, the oxyalkylene groups in said chains being oxyethylene and oxy-1,2-propylene groups and being derived from at least ⅓ part of 1,2-propylene oxide for each part of ethylene oxide by weight, preferably 1 to 3 parts and not more than 9 parts of 1,2-propylene oxide for each part of ethylene oxide by weight. The molecular weight attributable to said ether alcohol should be at least 1000, preferably 1500 to 6000.

The products provided in accordance with the invention can also be described as esters of ether alcohols characterized by a central aliphatic group, preferably having 3 carbon atoms, and 3 polyoxyalkylene chains attached to the carbon atoms of said central group, each of said polyoxyalkylene chains having a terminal ester group, the oxyalkylene groups in said polyoxyalkylene chains being both oxyethylene and oxy-1,2-propylene groups and being derived from at least ⅓ part of 1,2-propylene oxide for each part of ethylene oxide by weight.

The addition products which are esterified to produce the compositions of the present invention can be prepared in several ways, for example, by employing as an initial reactant to provide the central aliphatic group of the end product either glycerine, citric acid or 1,2,6-hexane triol. In either case the hydroxy groups react with the alkylene oxide to form three long chains each having a terminal primary hydroxy group.

The esterifying acid which is reacted with the trihydroxy addition product can be a polycarboxy acid, such as, for example, VR–1 acid (a polymeric fatty acid secured as a by-product in the degradation of castor oil to sebacic acid), diglycolic, maleic, glutamic, phthalic, terephthalic, glutaric, dilinoleic, succinic, pimelic, adipic, sebacic, isatoic, and homologues thereof. Where these polycarboxy acids form anhydrides it is preferable to employ the anhydride rather than the free acid as an esterifying agent because the esterification involves the elimination of water in the case of the free acid but direct esterification without elimination of chemically combined water in the case of the anhydride. As examples of polycarboxy acids containing more than two carboxy groups which may be employed in preparing the treating agents there may be mentioned citric acid, aconitic, trimellitic acid and homologues thereof.

Where the trihydric polyoxyalkylene addition product is esterified with a polycarboxy organic acid there is a possibility of forming mono-, di- or triesters, depending upon the relative proportions of the reactants and the extent of the esterification. Thus, using diglycolic acid as the esterifying agent one mol of the trihydric polyoxyalkylene addition product can be reacted with one mol of diglycolic acid to form a monoester or with two mols of the diglycolic acid to form a diester or with three mols of the diglycolic acid to form a triester with the elimination, respectively, of one, two or three mols of water. These esters, however, are only partial esters because each mol of diglycolic acid contains more than one carboxy group. Thus, the end product would contain free carboxy groups. However, the reaction can be carried further to cause both carboxy groups of the diglycolic acid to react with one, two or three mols of the trihydric addition product with the elimination of an additional quantity of water. Where all of the carboxy groups are reacted the end products are herein referred to as total esters. It will be recognized that mixed esters and mixtures of esters can be formed in the esterification reaction. Mixtures of trihydroxy polyoxyalkylene addition products can also be employed in preparing the products. If the polycarboxy organic acid contains more than two carboxy groups the possibilities of esterification are further increased.

Depending upon the extent of the esterification the end product will have terminal hydroxy groups or carboxy groups or both terminal hydroxy and terminal carboxy groups. In general, the preferred end products are those obtained by the reaction of one mol of a trihydric polyoxyalkylene compound of the class described with three mols of a dicarboxy organic acid with the elimination of more than three but less than six mols of water. In other words, the esterification reaction is preferably carried out to the extent that the amount of water eliminated is more than the theoretical quantity required to esterify each of the terminal hydroxy groups of the polyoxy-alkylene trihydroxy compound with a carboxy group of the polycarboxy acid but less than the amount theoretically required to form a total ester. Such esters are generally referred to as "monomeric" esters.

Where the end product contains free carboxy groups the carboxy groups may be further neutralized with alkalis or alkaline-reacting substances such as ammonia and amines (e.g., butylamine, amylamine and homologues thereof) to form salts. The end products may also be heated with primary and secondary amines to convert the free carboxy groups to amide groups (for example, by heating with butylamine, cyclohexylamine, amylamine, aniline, toluidine, diethylenetriamine, triethylenetetramine, tetraethylpentamine, dipropylenetriamine, tripropylenetetramine, and homologues thereof).

The esterification procedure used in preparing the products is to heat the reactants under conditions facilitating the elimination of water by distillation. It is usually preferable to carry out the preparation in the presence of a solvent which lends itself to azeotropic distillation. The reaction mass is heated at an elevated temperature until the theoretical amount of water is secured to indicate the desired amount of esterification.

The temperatures required in the esterification will vary depending upon the reactants but are usually within the range of 160° C. to 300° C. and in any event the reaction is stopped before gelation of the product occurs.

Since as indicated above it is possible to prepare the compositions of this invention by various routes and from a number of different classes of starting materials, the invention should not be limited by the following examples which are merely intended to illustrate some satisfactory procedures for preparing a few of the materials suitable for employment within the scope of the present invention.

Example I

A commercial size batch was prepared as follows:
Thirty-six hundred (3600) pounds of Dow Polyglycol 15–200, 350 pounds of diglycolic acid and 200 gallons of $SO_2$ extract were charged into a processing vessel provided with a means for heating, agitation and trapping aqueous distillate to permit the return of azeotrope to the reaction mass. The mixture was heated with agitation and at 170° C. an aqueous distillate began to form. The heating was continued until a total of 10.5 gallons of aqueous distillate had been secured. This required approximately 9 hours at a maximum temperature of 260° C. The reaction mass was cooled below 100° C. and 750 gallons $SO_2$ extract added with agitation to yield the finished product.

Numerous other derivatives of Polyglycol 15–200 were prepared with diglycolic acid as per the following table. In this group of compounds the ratio of hydroxy groups to carboxy groups was varied from 0.5 to 2.3 and the amount of aqueous distillate removed varied from 66% of theoretical to 160% of theoretical based on the lesser of the two functional groups present.

| Parts Polyglycol 15-200 | Parts Diglycolic Acid | Mol Ratio, OH:COOH | Water Removed as percent theoretical |
|---|---|---|---|
| 240 | 40 | 0.5 | 103 |
| 240 | 40 | 0.5 | 130 |
| 240 | 40 | 0.5 | 153 |
| 385 | 54 | 0.6 | 127 |
| 240 | 27 | 0.75 | 66 |
| 240 | 27 | 0.75 | 103 |
| 720 | 68 | 0.87 | 104 |
| 480 | 17.5 | 2.3 | 160 |

Example II

In a suitable reaction vessel there was added 240 parts of Polyglycol 15–200, 50 parts of substitute $SO_2$ extract and 30 parts of maleic anhydride. The mixture was heated with stirring to 160° C. and held at that temperature for 6 hours. After cooling 415 parts of $SO_2$ extract were added to yield the finished product.

Example III

In a suitable reaction vessel 240 parts of Polyglycol 15–200, 15 parts of maleic anhydride and 50 parts of substitute $SO_2$ extract were heated with agitation to 160° C. and held at this point for 6 hours. The temperature was then gradually increased until an aqueous distillate began to form at 210° C. Heating was continued until a total of 2.5 parts of aqueous distillate had been secured. After cooling 415 parts of $SO_2$ extract were added to yield the finished product.

Example IV

In a suitable reaction vessel 240 parts of Polyglycol 15–200, 50 parts of phthalic anhydride and 50 parts of $SO_2$ extract were heated to 230° C. and held at that point for 6 hours. After cooling 50 parts of methanol and 360 parts of $SO_2$ extract were added to yield the finished product.

Example V

In a suitable reaction vessel 240 parts of Polyglycol 15–200, 45 parts of adipic acid, 50 parts of $SO_2$ extract were heated until an aqueous distillate began to form at 210° C. Heating was continued until a total of 5.4 parts of aqueous distillate had been secured. After cooling 50 parts of methanol and 390 parts of $SO_2$ extract were added to yield the finished product.

Example VI

In a suitable reaction vessel 455 parts of Polyglycol 15–200, 105 parts of dimer acid and 90 parts of $SO_2$ extract were heated until an aqueous distillate began to form at 217° C. Heating was continued until 4.3 parts of aqueous distillate were secured over a period of 4 hours and at a maximum temperature of 267° C. Fifty-seven (57) parts of this intermediate was removed and mixed with 70 parts of $SO_2$ extract to yield Example VI-A.

The balance of the intermediate was heated an additional 2 hours to 275° C. which resulted in the removal of an additional 0.9 part of aqueous distillate. 46.5 parts of this secondary intermediate was removed and mixed with 57 parts of $SO_2$ extract to yield Example VI-B.

The balance of the secondary intermediate was heated another 2 hours at 275° C. to yield an additional 0.6 part of aqueous distillate. One hundred thirty-nine (139) parts of this final intermediate was then mixed with 170 parts of $SO_2$ extract to yield Example VI-C.

Example VII

In a suitable reaction vessel 240 parts of Polyglycol 15–200, 19.2 parts citric acid and 100 parts of $SO_2$ extract were heated with agitation. At about 190° C. an aqueous distillate began to form and heating was continued until a total of 3.5 parts had been secured at a maximum temperature of 220° C. After cooling, 50 parts of methanol and 360 parts of $SO_2$ extract were added to yield the finished product.

Example VIII

In a suitable reaction vessel 240 parts of Polyglycol 15–200, 27 parts of diglycolic acid, 10 parts of maleic anhydride and 50 parts of $SO_2$ extract were heated with stirring until an aqueous distillate began to form at 192° C. Heating was continued until a total of 6.6 parts of aqueous distillate had been secured in approximately 2 hours at a maximum temperature of 265° C. After cooling, 370 parts of SO₂ extract were added to yield the finished product.

Other derivatives were prepared in which the mol ratio of diglycolic acid to maleic anhydride varied from 2:1 as in the instant example to 1:2. Likewise derivatives were prepared in which the mol ratio of diglycolic acid to phthalic anhydride varied from 2:1 to 1:2.

*Example IX*

In a suitable reaction vessel 240 parts of Polyglycol 15–200, 200 parts of a polyoxypropylene glycol having a molecular weight of 2000, 40 parts of diglycolic acid and 100 parts of SO₂ extract were heated with agitation. At 183° C. an aqueous distillate began to form. Heating was continued until a total of 8.5 parts of aqueous distillate had been secured in approximately 4 hours at a maximum temperature of 248° C. After cooling, 30 parts of methanol and 600 parts of SO₂ extract were added to yield the finished product.

*Example X*

In a suitable reaction vessel 100 parts of Polyglycol 15–100, 40 parts of diglycolic acid and 50 parts of SO₂ extract were heated with agitation. At approximately 175° C. an aqueous distillate began to form and heating was continued until a total of 5.4 parts of aqueous distillate had been secured at a maximum temperature of 225° C. After cooling, 200 parts of SO₂ extract was added to yield the finished product.

*Example XI*

In a suitable reaction vessel 240 parts of Polyglycol 19–120, 60 parts of maleic anhydride and 50 parts of SO₂ extract were heated with agitation to 160° C. The temperature was held at this point for 6 hours to complete the condensation. After cooling 490 parts of SO₂ extract was added to yield the finished product.

By way of illustrating the effectiveness of the products contemplated by this invention, the method of testing their efficiency in bottle tests will be described in the following examples.

*Example XII*

Field bottle tests were made on samples of emulsified oil taken from the Stanolind Oil and Gas Company field at Hastings, Texas. A sample grindout showed that these emulsions contained about 41 parts of water per 100 parts of emulsion. A gun barrel system was being used in this field.

One hundred (100) cc. samples were taken and placed in conventional field test bottles. A finding ratio test indicated a treating ratio of 0.05 cc. of a 5% solution of the treating chemical was required per 100 cc. of sample.

Every effort was made to maintain conditions comparable to those present in a full scale plant treatment. The test chemical was added to the samples in the test bottles and each bottle was agitated by shaking it 200 times at atmospheric temperatures. The compositions in the test bottles were then allowed to settle and were tested for water drop at predetermined periods of time.

After cold agitation each sample was heated to a temperature of 140° C. and shaken an additional 100 times. After agitation at the elevated temperatures the samples were allowed to stand to permit settling and stratification of the water and were again tested for water drop.

The composition described in Example I caused 40 out of the 41 parts of water to separate before the bottles were given hot agitation. The same amount separated 30 minutes after hot agitation. The results obtained from this product were therefore excellent.

*Example XIII*

The composition described in Example II was tested by the procedure described in Example XII and caused 38 out of the 41 parts of water to separate before hot agitation and 39 out of the 41 parts of water to separate 30 minutes after hot agitation.

*Example XIV*

The composition described in Example IV was tested by the precedure described in Example XII and caused 38 out of the 41 parts of water to separate before hot agitation and 40 out of the 41 parts of water to separate 30 minutes after hot agitation.

*Example XV*

The composition described in Example V was tested by the procedure described in Example XII and caused 38 out of the 41 parts of water to separate before hot agitation and 39 out of the 41 parts of water to separate 30 minutes after hot agitation.

*Example XVI*

The composition described in Example VI–A was tested in the general manner described in Example XII with substantially the same results as described in Example XV.

*Example XVII*

The composition described in Example VIII was tested according to the procedure described in Example XII and caused 38 out of the 41 parts of water to separate before hot agitation and 39 out of the 41 parts of water to separate 30 minutes after hot agitation.

*Example XVIII*

The composition described in Example IX was tested according to the procedure described in Example XII with substantially the same results obtained in Example XVII.

The compositions prepared in accordance with the practice of the invention were also tested on water-in-oil petroleum emulsions obtained from the Fruitvale field in California and found to be very satisfactory. In this field a wash tank system was being used.

Similarly the other tests were made in other fields including the Welder and Government Wells field in Texas with good results.

In the foregoing examples Dow Polyglycol 15–200 is an aliphatic compound having three chains made up of equal parts by weight of oxyethylene and oxy-1,2-propylene groups added to a single molecule containing three carbon atoms (glycerine), each of said chains having a terminal hydroxy group and the molecular weight being approximately 2400. Dow Polyglycol 15–100 is a similar trihydroxy compound having a molecular weight of approximately 1000. Dow Polyglycol 19–120 is a similar trihydroxy compound built up with propylene oxide and ethylene oxide added to glycerine in a 2:1 weight ratio and having a molecular weight of approximately 1200.

The Dow Polyglycol 15–100 is prepared as described in Example I of U.S. Patent 2,733,272. The Dow Polyglycol 15–200 is prepared as described in Example II of U.S. Patent 2,733,272, preparation 4 in the table in column 5 of said patent. In this composition the ratio of oxides to glycerol is 72:1. Another trihydroxy ether of glycerol eminently useful as a starting material in the practice of the invention is Dow Polyglycol 15–500 which corresponds to preparation 5 in the table in column 5 of U.S. Patent 2,733,272. In this composition the ratio of oxides to glycerol is 264:1.

Excellent results in the practice of the invention are obtained with polycarboxy esters of trihydroxy mixed poly(oxyethylene-oxy-1,2-propylene) ethers of glycerol or 1,2,6-hexane triol in which the mol ratio of alkylene oxide per mol of glycerine or 1,2,6-hexane triol is within the range from 30:1 to 300:1, the oxyethylene groups represent from about 20 to about 80 mol percent of the total oxyalkylene groups and the average molecular weight of the oxyalkylated triol is within the range from about 1500 to about 6000.

In connection with the preferred degree of esterification set forth in Example I which is given in terms of the amount of water removed as a percentage of the theoretical amount of water capable of being removed in forming a total ester, it can be generally stated that the esterification is preferably sufficient to form ester groups corresponding to from about 2/3 to about 5/3 on a molar basis of the ester groups theoretically formed by the esterification of the three hydroxy groups in the polyoxyalkylated triol.

The demulsifying compositions of the present invention are preferably employed in the proportion of one part of demulsifying agent to from 10,000 to 100,000 parts of emulsion either by adding the concentrated product directly to the emulsion or after diluting with a suitable vehicle in the customary manner.

Among the suitable hydrocarbon vehicles which can be employed as diluents is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and are suitable for use in breaking water-in-oil petroleum emulsions in the mid-continent oil fields, including Oklahoma, Illinois, Kansas, the Gulf Coast, Louisiana, southwest Texas and California.

The products employed in accordance with this invention are especially useful in treating low gravity (e.g., 10 to 20° A.P.I.) petroleum crude oils at temperatures above about 165° F., preferably 170 to 200° F. At these higher temperatures the water solubility of the products employed in accordance with the invention decreases and their effectiveness in breaking petroleum emulsions increases. The utility of the products employed for the purpose of the invention is particularly outstanding in the treatment of crude oils where the water is suspended throughout the oils as such rather than in an emulsified condition.

This application is a continuation-in-part of my copending application Serial No. 256,153 filed November 13, 1951, now abandoned, and is directed toward subject matter which was required to be divided from said copending application.

The invention is hereby claimed as follows:

1. An organic polycarboxy acid monomeric ester of an organic polycarboxy acid and an ether alcohol having three terminal primary hydroxy groups, said ester being characterized by a central aliphatic group containing 3 to 6 carbon atoms and three polyoxyalkylene chains attached to different carbon atoms of said central group, the oxyalkylene groups in said polyoxyalkylene chains being oxyethylene and oxy-1,2-propylene groups and being derived from at least 1/3 part and not more than 9 parts of 1,2-propylene oxide for each part of ethylene oxide by weight, the molecular weight of said ester attributable to said ether alcohol being at least 1000.

2. A diglycolic acid monomeric ester of an ether alcohol having three terminal primary hydroxy groups, said ester being characterized by a central aliphatic group containing 3 to 6 carbon atoms and three polyoxyalkylene chains attached to different carbon atoms of said central group, the oxyalkylene groups in said polyoxyalkylene chains being oxyethylene and oxy-1,2-propylene groups and being derived from at least 1/3 part and not more than 9 parts of 1,2-propylene oxide for each part of ethylene oxide by weight, the molecular weight of said ester attributable to said ether alcohol being at least 1000.

3. A maleic acid monomeric ester of an ether alcohol having three terminal primary hydroxy groups, said ester being characterized by a central aliphatic group containing 3 to 6 carbon atoms and three polyoxyalkylene chains attached to different carbon atoms of said central group, the oxyalkylene groups in said polyoxyalkylene chains being oxyethylene and oxy-1,2-propylene groups and being derived from at least 1/3 part and not more than 9 parts of 1,2-propylene oxide for each part of ethylene oxide by weight, the molecular weight of said ester attributable to said ether alcohol being at least 1000.

4. A phthalic acid monomeric ester of an ether alcohol having three terminal primary hydroxy groups, said ester being characterized by a central aliphatic group containing 3 to 6 carbon atoms and three polyoxyalkylene chains attached to different carbon atoms of said central group, the oxyalkylene groups in said polyoxyalkylene chains being oxyethylene and oxy-1,2-propylene groups and being derived from at least 1/3 part and not more than 9 parts of 1,2-propylene oxide for each part of ethylene oxide by weight, the molecular weight of said ester attributable to said ether alcohol being at least 1000.

5. A mixture of monomeric esters of organic dicarboxy acids containing up to 36 carbon atoms and trihydroxy mixed poly(oxyethylene-oxy-1,2-propylene) ethers of triols from the group consisting of glycerol and 1,2,6-hexane triol in which the mol ratio of alkylene oxide per mol of said triol is within the range from 30:1 to 300:1, the ethylene oxide groups represent from about 20 to about 80 mol percent of the total oxyalkylene groups and the average molecular weight of the oxyalkylated triol is within the range from about 1500 to about 6000.

6. A mixture of monomeric esters of organic dicarboxy acids containing 4 to 36 carbon atoms and trihydroxy mixed poly(oxyethylene-oxy-1,2-propylene) ethers of glycerol in which the mol ratio of alkylene oxide per mol of said glycerol is within the range from 30:1 to 300:1, the ethylene oxide groups represent from about 20 to about 80 mol percent of the total oxyalkylene groups and the average molecular weight of the oxyalkylated glycerol is within the range from about 1500 to about 6000.

7. A mixture of monomeric esters as claimed in claim 6 in which the mol ratio of ethylene oxide to 1,2-propylene oxide is approximately 1:1 and the mol ratio of alkylene oxides to glycerol is approximately 72:1.

8. A mixture of monomeric esters as claimed in claim 6 in which the mol ratio of ethylene oxide to 1,2-propylene oxide is approximately 1:1 and the mol ratio of alkylene oxides to glycerol is approximately 264:1.

9. A mixture of monomeric esters of organic dicarboxy acids containing 4 to 36 carbon atoms and trihydroxy mixed poly(oxyethylene-oxy-1,2-propylene) ethers of glycerol in which the mol ratio of alkylene oxide per mol of said glycerol is within the range from 30:1 to 300:1, the ethylene oxide groups represent from about 20 to about 80 mol percent of the total oxyalkylene groups, the average molecular weight of the oxyalkylated glycerol is within the range from about 1500 to about 6000, said mixture containing esters having free carboxy groups.

References Cited in the file of this patent

UNITED STATES PATENTS

| | | |
|---|---|---|
| 2,505,948 | De Groote et al. | May 2, 1950 |
| 2,597,204 | Todd et al. | May 20, 1952 |
| 2,602,064 | De Groote | July 1, 1952 |
| 2,652,424 | De Groote | Sept. 15, 1953 |
| 2,733,272 | Horsley et al. | Jan. 31, 1956 |